US011676067B2

(12) United States Patent
Kneller et al.

(10) Patent No.: US 11,676,067 B2
(45) Date of Patent: Jun. 13, 2023

(54) SYSTEM AND METHOD FOR CREATING DATA TO TRAIN A CONVERSATIONAL BOT

(71) Applicant: Nice Ltd., Ra'anana (IL)

(72) Inventors: Hila Kneller, Zufim (IL); Lior Ben Eliezer, Beer Yaakov (IL); Yuval Shachaf, Netanya (IL); Gennadi Lembersky, Haifa (IL); Natan Katz, Tel Aviv (IL)

(73) Assignee: Nice Ltd., Ra'anana (IL)

( * ) Notice: Subject to any disclaimer, the term of this patent is extended or adjusted under 35 U.S.C. 154(b) by 429 days.

(21) Appl. No.: 16/791,316

(22) Filed: Feb. 14, 2020

(65) Prior Publication Data

US 2021/0256417 A1    Aug. 19, 2021

(51) Int. Cl.
| | | |
|---|---|---|
| *G06N 20/00* | (2019.01) | |
| *H04L 51/02* | (2022.01) | |
| *G10L 15/22* | (2006.01) | |
| *G10L 15/18* | (2013.01) | |
| *G10L 15/16* | (2006.01) | |
| *G10L 15/06* | (2013.01) | |
| *G10L 15/183* | (2013.01) | |
| *G06F 40/30* | (2020.01) | |
| *G10L 13/00* | (2006.01) | |

(52) U.S. Cl.
CPC .............. *G06N 20/00* (2019.01); *G06F 40/30* (2020.01); *G10L 15/063* (2013.01); *G10L 15/16* (2013.01); *G10L 15/183* (2013.01); *G10L 15/1815* (2013.01); *G10L 15/22* (2013.01); *H04L 51/02* (2013.01); *G10L 13/00* (2013.01); *G10L 2015/0631* (2013.01); *G10L 2015/0633* (2013.01); *G10L 2015/223* (2013.01)

(58) Field of Classification Search
CPC ............. G06F 40/30; G10L 2015/0631; G10L 2015/0633; G10L 15/063; G10L 15/22
See application file for complete search history.

(56) References Cited

U.S. PATENT DOCUMENTS

| | | | | |
|---|---|---|---|---|
| 8,515,736 | B1 * | 8/2013 | Duta ...................... | G06F 40/30 704/9 |
| 10,943,583 | B1 * | 3/2021 | Gandhe ................ | G10L 15/183 |
| 2007/0156392 | A1 * | 7/2007 | Balchandran ......... | G06F 40/237 704/9 |
| 2014/0358539 | A1 * | 12/2014 | Rao ....................... | G10L 15/063 704/243 |
| 2015/0073788 | A1 * | 3/2015 | Sak ....................... | G10L 15/063 704/235 |

(Continued)

*Primary Examiner* — Samuel G Neway
(74) *Attorney, Agent, or Firm* — Pearl Cohen Zedek Latzer Baratz LLP (57) ABSTRACT

A system and method for creating input data to be used to train a conversational bot may include receiving a set of conversations, each conversation including sentences, classifying each sentence into a dialog act taken from a number of dialog acts, for each set of sentences classified into a dialog act, clustering the set of sentences into clusters based on the content (e.g. text) of the sentences, each cluster having a cluster name or label, and generating a language model based on the cluster labels. Slots may be identified in the sentences based in part on the dialog act classifications. A bot may be trained using data such as the slots, language model, and clusters.

15 Claims, 5 Drawing Sheets

(56) References Cited

U.S. PATENT DOCUMENTS

| | | | | |
|---|---|---|---|---|
| 2018/0131645 A1* | 5/2018 | Magliozzi | .............. | G06F 40/30 |
| 2019/0205322 A1* | 7/2019 | Dobrynin | .............. | G06F 40/186 |
| 2019/0392315 A1* | 12/2019 | Tam | .............. | G06F 17/16 |
| 2020/0193094 A1* | 6/2020 | Topol | .............. | G06T 11/206 |
| 2021/0256417 A1* | 8/2021 | Kneller | .............. | G06N 3/088 |

* cited by examiner

FIG. 1

| SESSION_ID | MESSAGE_ID | MESSAGE_TIMESTAMP | MESSAGE_FROM | MESSAGE_TEXT |
|---|---|---|---|---|
| 1 | 1 | 2016-03-09T23:58:42.950Z | customer | Hello, i was wondering if you can tell me where a good restaurant is to book? |
| 1 | 2 | 2016-03-10T00:19:02.673Z | agent | Sure! How many people are in your party? |
| 2 | 1 | 2016-03-09T23:09:09.027Z | customer | Please book a table for 4 in Seattle for tomorrow at 8:00 PM at Bar Botto under the name Matt Smith |
| 2 | 2 | 2016-03-09T23:26:26.085Z | agent | Success! Your reservation has been confirmed. Please enjoy your meal! |
| 3 | 1 | 2016-03-09T23:35:38.320Z | customer | Need a reservation for a soccer team about 12 kids and 6 adults. Pizza would be the best option for Sunday afternoon. |
| 3 | 2 | 2016-03-09T23:52:55.084Z | agent | Great! What city are you dining in? |
| 3 | 3 | 2016-03-10T00:01:40.087Z | customer | Portland |
| 3 | 4 | 2016-03-10T00:12:37.967Z | agent | John's Pizza Trattoria, The Neapolitan Pizzeria, and Jane's Wood Fired - Hillsboro can accommodate multiple tables for 6 in the afternoon on Sunday, March 13th. Which restaurant and what time would you like to book? |
| 3 | 5 | 2016-03-10T00:16:38.401Z | customer | What is the price range of Jane's Wood Fired Pizza? |

SYSTEM AND METHOD FOR CREATING DATA TO TRAIN A CONVERSATIONAL BOT

FIELD OF THE INVENTION

The present invention relates generally to conversational bots or automated conversational processes, and more specifically to generation of data for use in creating such bots.

BACKGROUND OF THE INVENTION

A conversational bot, automatic bot or conversational assistant, also termed a chatbot or bot, is an automated computer-executed process, e.g. an intelligent conversational agent system, that may engage in a conversation or interaction with a real person, typically via a text exchange or a voice and audio exchange. Chatbots may simulate how a human would behave as a conversational partner, and may be used, for example for customer service. e.g. answering questions a customer has about a product, an order, billing, or providing information and answering questions regarding an organization. Chatbots may use techniques including artificial intelligence (AI), including deep learning, natural language understanding (NLU), natural language processing (NLP), or other systems.

Training or setting up a bot for a specific scenario or a business process may require tedious manual work performed by a person that may take weeks or even months to accomplish. Typically, such work is never finished: the bot may need to be continuously updated to cover new situations and emerging topics. A human may need to manually listen to and analyze chat or call transcripts, identify several dialog acts or intents, and combine several dialog acts or intents into possible flows.

SUMMARY OF THE INVENTION

A system and method for creating input data to be used to train a conversational bot may include receiving a set of conversations or interaction transcripts, each conversation including sentences, classifying each sentence into a dialog act taken from a number of dialog acts, for each set of sentences classified into a dialog act, clustering the set of sentences into clusters based on the content (e.g. text) of the sentences, each cluster having a cluster name or label, and generating a language model (LM) based on the cluster labels. Slots may be identified in the sentences based in part on the dialog act classifications or groupings, the slots used as input to a conversational bot creation process. A bot may be trained using data such as the slots, language model, and clusters.

Embodiments of the invention may improve the process of training conversational bots using human chat logs and audio calls transcripts. Such a process is not feasible for a human to perform, as the human would have to review over hundreds or thousands of calls, interactions or chats manually. Using embodiments of the invention, large amounts of real agent-customer conversations such as chats and calls may be used to help build or update bots faster than has been done in the past. The training data creation process may use NLU technology, deep learning and language modeling to automatically generate or create bot training data or automatically create automatic bots. Embodiments of the invention may provide a practical application of a series of language processing algorithms to create automated computer processes capable of engaging in conversations with people.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example. "processing," "computing," "calculating," "determining," "establishing". "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method may generate or create input data to be used to train a conversational bot. The process may take as input a set of conversations or interactions, e.g. a set of transcripts such as back and forth or "stereo" conversations between two or more people, in text or audio form. Other input, from other media sources, may also be used. The conversations may include messages (e.g. each set of words or sentences transmitted, said or sent by a party) which may include sentences (which may be phrases or sentence fragments). The process may output data to be used to train a bot, such as clusters, cluster labels, slots, slot values, and/or a language model (LM) based on or related to the clusters and slots. Each of the received sentences may be assigned to or classified to a dialog act, typically taken from a preexisting set of dialog acts. For each set of sentences classified into a certain dialog act those sentences may be grouped or clustered into clusters based on. e.g., the content (e.g. the words or text) of the sentences. Each cluster may have a cluster label or name. A LM (e.g. a NN, or another structure or set of structures) may be created or based on for example the cluster labels, sentences, or other data, and a conversational bot may be created, configured or trained based on the LM and/or other information such as the slots, slot values, sentences, etc.

Figure 1:
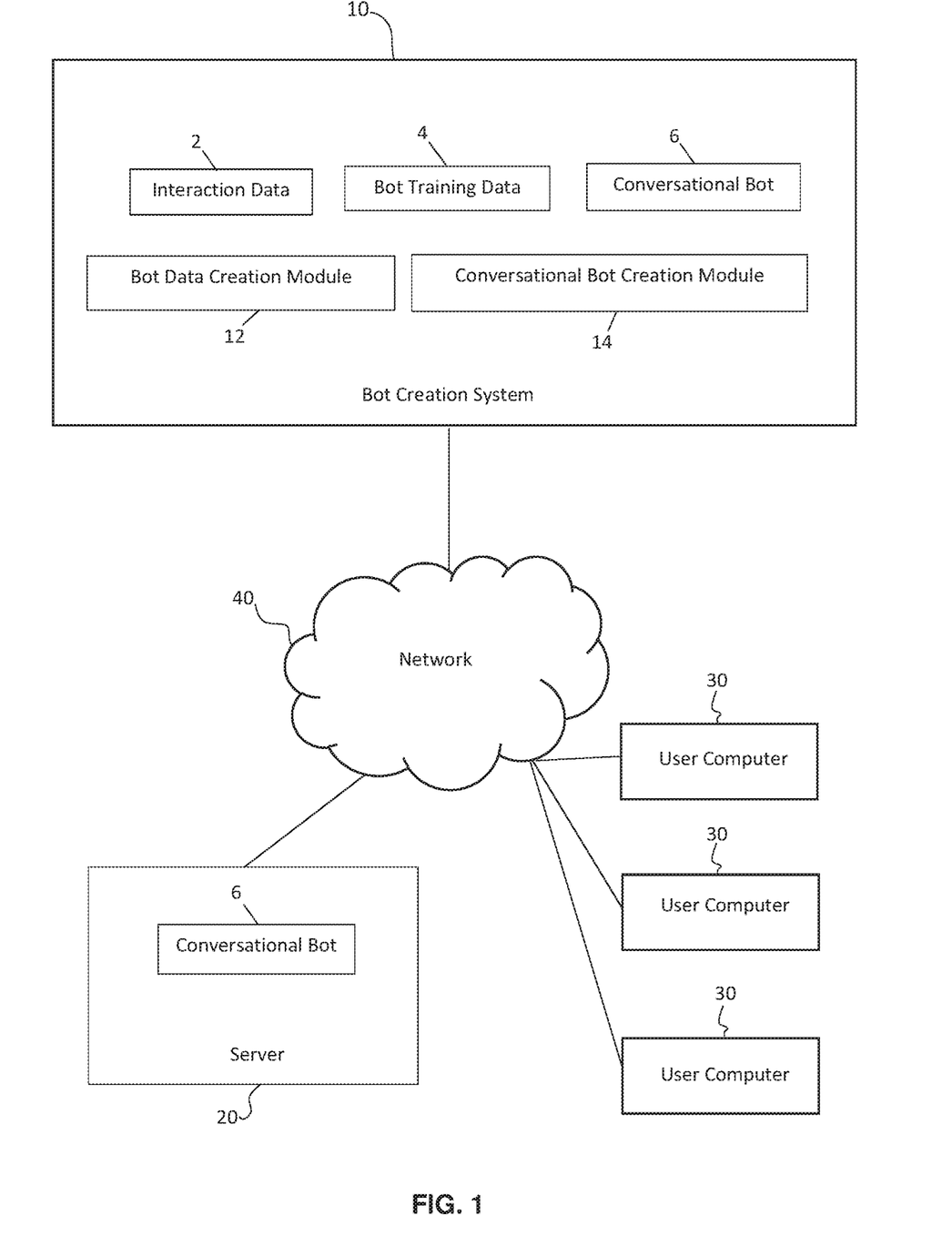
FIG. 1 shows high level block diagram of an exemplary computing system according to illustrative embodiments of the present invention.

FIG. 1 shows a high level block diagram of an exemplary computing system according to illustrative embodiments of the present invention. Referring to FIG. 1, a conversational bot creation system 10 may accept interaction or interaction or conversation data 2, e.g. transcripts or audio data (to be converted to text before processing) representing, typically, many interactions. Conversation or interaction data 2 may be coded as a JavaScript Object Notation ("JSON") file describing a sequence of dialog acts where for each dialog the actor side is known or denoted, e.g. agent or customer. Other suitable formats may be used.

Figure 2:
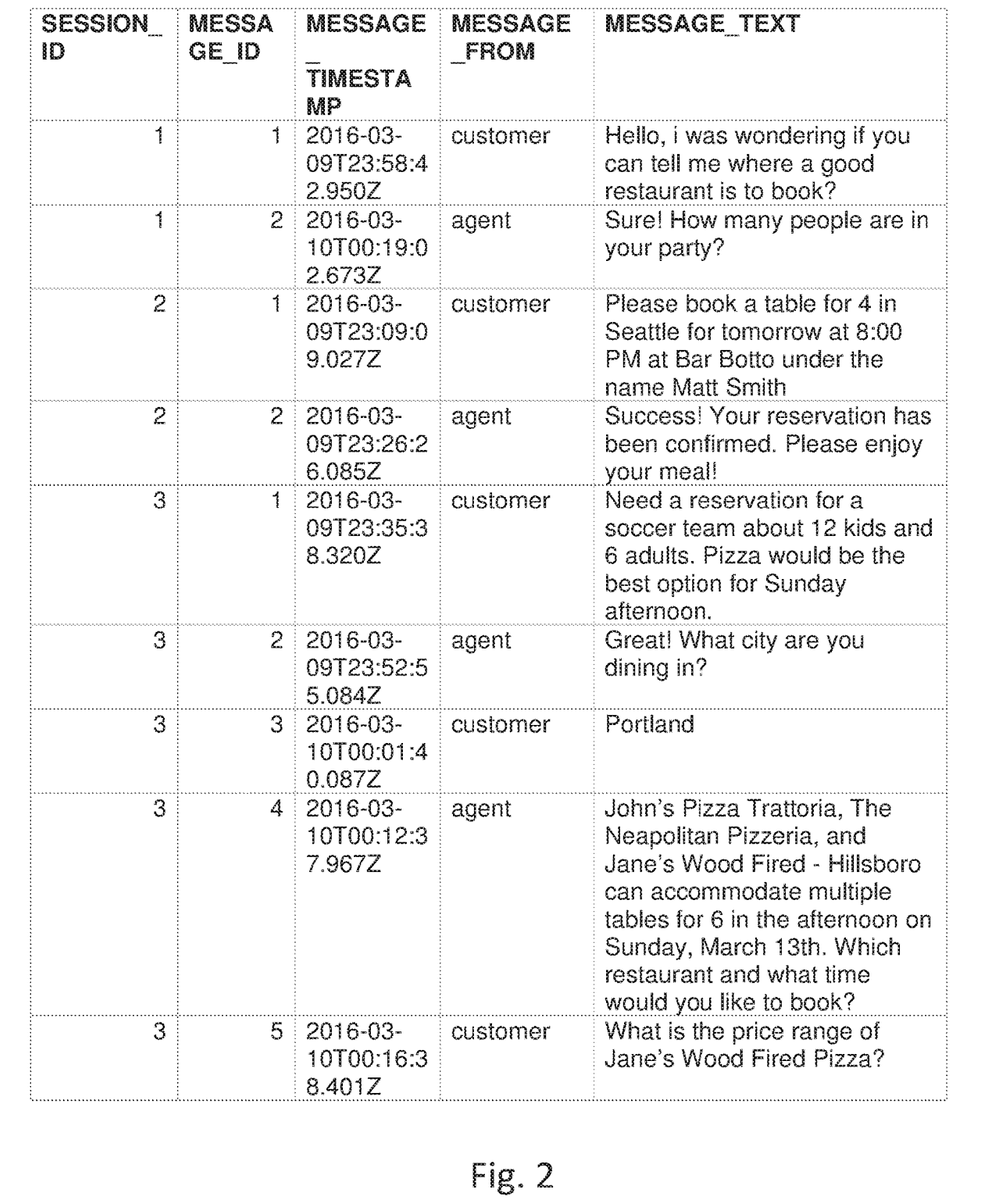
FIG. 2 depicts a sample set of input conversation data, according to an embodiment of the present invention.
Figure 5:
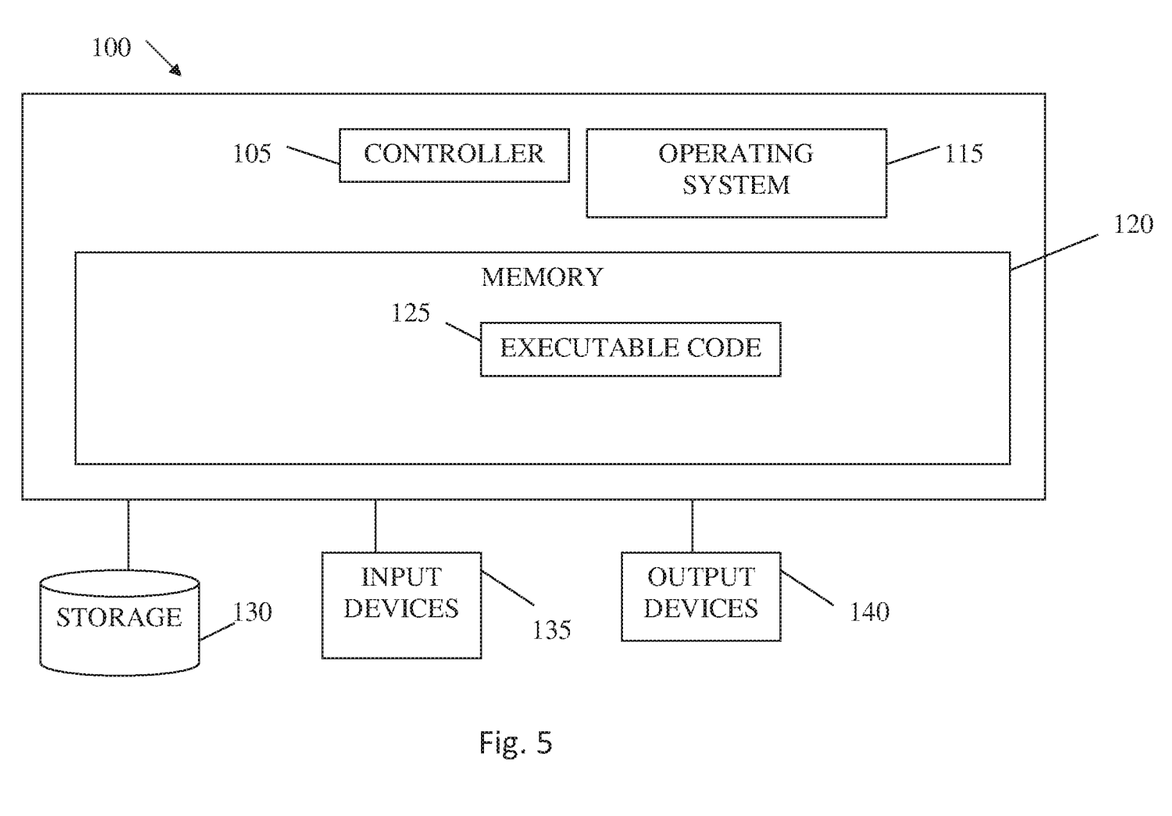
FIG. 5 shows a high level block diagram of an exemplary computing device according to illustrative embodiments of the present invention.

Conversational bot data creation module 12 may create bot training data 4 (e.g. a LM, and/or slots, etc.) based on the interaction data 2, e.g. using a process such as described in FIG. 2 and elsewhere herein. Conversational bot creation module 14 may create or train a conversational bot 6 by taking as input bot training data and using known bot creation tools (e.g. the Google Dialogflow system or other tools). Conversational bot 6 may be implemented by and executed by a server 20 to for example interact with users or customers via user computers 30 (e.g. personal computers, telephones, etc.), accepting questions or conversational messages input (e.g. typed into, spoken into) computers 30, and responding to the user or customer, the response output via computers 30. A conversational bot 6 may interact with a user via text (e.g. online chat, text messages) or voice, using voice recognition and production techniques (e.g. TTS (text to speech), ASR (automatic speech recognition) and STT (speech to text)). One or more networks 40, e.g. the internet and/or intranets, may connect the various computers. Each of computers such as creation system 10, server 20 and user computers 30 may be computers such as shown in FIG. 5, and each of modules such as conversational bot 6, bot data creation module 12 and bot creation module 14 may be or may be executed by computers such as shown in FIG. 5. In other embodiments, functionality may be distributed differently; for example different computers may create bot data and train a bot.

An embodiment of the present invention may take as input or receive transcripts or audio files of typically large numbers of chat sessions, interactions or conversation, analyze the data, and produce data useful for training a conversational bot or conversational assistant. FIG. 2 depicts a sample set of input conversation data, according to an embodiment of the present invention. Each conversation may include multiple back-and-forth exchanges each including one or more sentences or phrases (when used herein, a "sentence" may include a full grammatical sentence, a short phrase without a verb, an interrupted phrase, or text that may be considered a grammatically incomplete sentence, such as "Yes", "What I meant was . . . ", etc.). Audio recordings may be transformed into text data such as shown in FIG. 2, using ASR. Typically, the data input includes interactions, which may be back-and-forth conversations, typically between two people (more people may be involved), the people typically being a customer and an agent. An interaction may include messages, each message being what is texted, transmitted, or spoken by one party in a turn in a conversation; each message may include more than one sentence. Typically, conversations between two or more humans are used as input to train a computerized chat. The example data in FIG. 2 shows a comma separated value (CSV) file with certain fields; other types of files with other fields or data may be used. In FIG. 2, the following list of fields is shown:

SESSION_ID—a unique designator of the interaction (chat or audio), e.g. each session or interaction between an agent and customer may have a separate SESSION_ID;

MESSAGE_ID—an ordered message, utterance or turn number in the session;

MESSAGE_TIMESTAMP—a time (shown here in an absolute date/time, but which also may be relative to the beginning of the interaction) when the message was sent (in case of a chat) or a time of the beginning of a message, spoken turn, or utterance in an audio call;

MESSAGE_FROM—which person speaks or transmits the utterance or message, e.g. 'agent' or 'customer';

MESSAGE_TEXT—the content, e.g., actual words, of the message or utterance.

Figure 3:
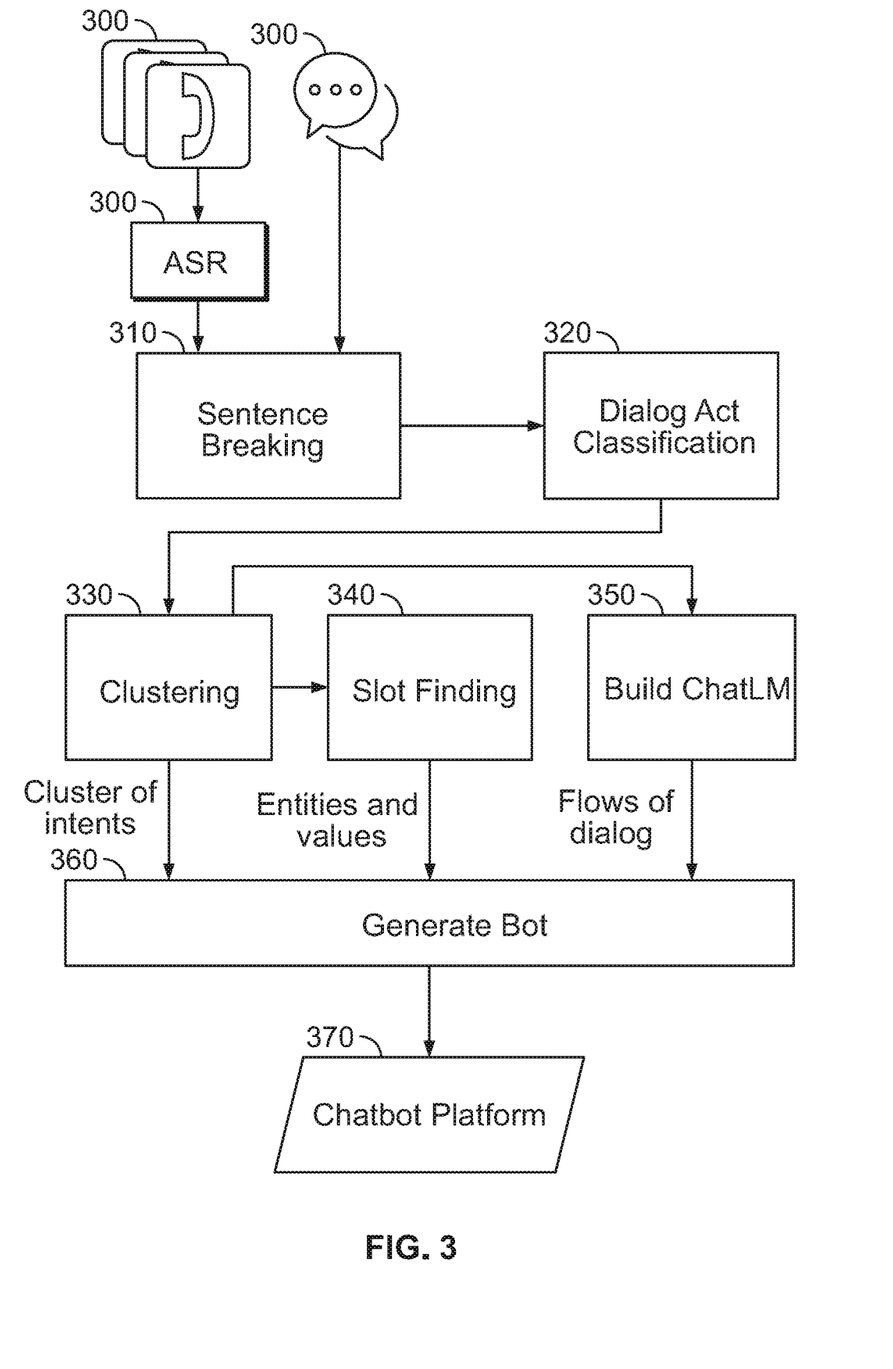
FIG. 3 shows a flowchart of a method according to illustrative embodiments of the present invention.

FIG. 3 shows a flowchart of a method according to illustrative embodiments of the present invention. The operations of FIG. 3 may be executed by computer systems such as those shown in FIG. 1. In operation 300 conversation or interaction data, possibly first processed by ASR, may be received or input. The conversation or interaction data may include back-and- and forth exchanges, where each party speaking or messaging provides a message including one or more sentences. In operation 310, the messages may be split, divided or broken into sentences. In operation 320, the resulting sentences may be classified or assigned into dialog acts; the dialog act classes or groups may be pre-determined. In operation 330, the sentences may be clustered or grouped. The sentences may be clustered into clusters based on the content of the sentences, and each cluster may have a cluster label or name. In operation 340, slots may be defined or found in the sentences. In operation 350, a LM may be built or generated, and from that LM a bot may be created or trained in operation 360. In operation 370, a resulting bot may execute, and may interact with a person.

An embodiment may receive or input a set of conversations, each conversation including sentences (e.g. operation 300, FIG. 3). Input transcript or conversation data (e.g. multiple transcriptions, interactions or conversations, such as shown in FIG. 1) may be broken or divided into sentences (e.g. operation 310, FIG. 3). The input representing each message may be a string, and the output may be an array of strings or another suitable format for a message divided into sentences. There may be multiple sentences in one message in conversation data. For example, in a message that includes "No tables are available within 2.5 hours of your 12:00 PM request. Would you like to try a different day?" there are two sentences. In this example message, the first sentence is a response to a customer request and the second one is a repeated query. These sentences may be separated and may be treated differently.

Known NLP sentence breaking techniques may be used. One embodiment may split a message based on punctuation marks in the messages, such as ".", "?" and "!". Some embodiments may use more accurate approaches such as machine learning models (e.g. neural networks (NNs) and deep learning) specifically trained to break documents into sentences or advanced NLP models such as dependency parsing. For example, a sentence breaking or division capability from the SpaCy (https://spacy.io/) open-source tool may be used.

Sentences may be input to a dialog act classification process (e.g. operation 320, FIG. 3), to classify, assign or group each sentence into one of several dialog acts or intents based on its content, and associate or tag each sentence with a dialog act tag or label (e.g. resulting in multiple sets of sentences, each set corresponding to a different dialog act). Dialog act tags or labels may be a pre-set list of tags or labels such as the example tags shown in Table 1 below. A dialog act may describe or represent the role of the sentence in the dialog. e.g. request, inform, welcome, etc. A dialog act may describe what kind of statement the sentence is such as a response, greeting, etc. Assigning a dialog act or intent to each sentence may result in the creation of multiple sets of sentences, where each set of sentences is classified into or assigned a dialog act.

An example and non-exhaustive list of dialog acts or intents is shown in Table 1:

TABLE 1

| Dialog Act | Sentence |
| --- | --- |
| closing | Thank you for using our service |
| confirm_answer | Certainly, I'll reserve that table for you now. |
| Confirm_question | Do you mean Mexican or Spanish cuisine? |
| Deny | No thank you |
| greeting | Good morning. |
| Inform | Friday at 5PM |
| multiple_choice | Please select from the following: 1) Ciao Bella 2) Ronita 3) Anna Rosa's Ristorante Italiano |
| not_sure | I'm not sure what you are asking. |
| Request | Hello, I was wondering if you can tell me where a good restaurant is to book? |
| Welcome | You are welcome |

Various methods may be used to classify, group or assign dialog acts to sentences, words or phrases. A set of rules may be used in one embodiment; another embodiment may use a trained deep learning model based on a convolutional neural network (CNN) architecture. The input to the model may be a set of labeled sentences where each word is translated into a pre-trained embedding (e.g. a vector of real numbers) and the label is one of the dialog acts such as those listed above. Word embedding may map words or phrases from the vocabulary to vectors (e.g. an ordered list of numbers) of real numbers. At inference (execution) time the model may input a sentence, translate each word into an embedding, and output the most probable dialog act according to the model. An alternate embodiment may use existing deep learning approaches such as a CNN or RNN architecture or classic machine learning approaches, such as the XGBoost, random forest methods, a support-vector machine (SVM) or other techniques. Random forests are an ensemble learning method for classification, regression and other tasks that operates by constructing a multitude of decision trees at training time and outputting the class that is the mode of the classes (classification) or mean prediction (regression) of the individual trees. A support-vector machine is a supervised learning model with associated learning algorithms that analyze data used for classification and regression analysis. A recurrent neural network (RNN) is a class of artificial neural networks where connections between nodes form a directed graph along a temporal sequence. Alternatively, one can implement a rule-based algorithm to classify sentences into dialog acts.

A NN may be an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

The output of a dialog act identification or tagging process may be input along with other data such as the text of the sentences into a grouping or clustering process (e.g. operation 330, FIG. 3), which may group similar sentences together based on their content (e.g. the actual words in the sentence) and dialog act identification or tag, to group or cluster together sentences that have the same dialog act. For each set of sentences classified into a dialog act, the set of sentences may be clustered or grouped into groups or clusters based on the content of the sentences. Each sentence may be assigned to or grouped into a cluster. A separate clustering process may be performed for each group of sentences corresponding to a dialog act; e.g. for each dialog act (and corresponding sentences) a clustering process may be done. The result of a clustering process may be clusters of intents.

Each cluster may have a name, label or tag. A cluster name, label, tag or identification may be for example a combination of a dialog act and a possibly arbitrary label such as a number or integer, e.g. cluster number, which may differentiate the cluster from other clusters with the same dialog act. For example a cluster name may be the dialog act customer_request combined with the arbitrary or ordered cluster number 5, to form the label "customer_request_5". In one embodiment, for each dialog act tag or identification, the sentences having or corresponding to this identification or tag may be clustered or grouped, separate from sentences having different tags or identifications. Each conversation or interaction may thus be represented as an ordered series of cluster names, labels or tags.

In one embodiment, at the start of a grouping or clustering process, a sentence's embedding may be computed, for example based on the content or words of the sentence. A word, sentence or other embedding may quantify or categorize semantic similarities between words, sentences or other linguistic items based on for example their distributional properties in large samples of language data. Known techniques may be used to build an embedding for a sentence. In one embodiment, a sentence embedding may be an average of the word embeddings in the sentence—e.g. the word embedding vectors for a sentence may be averaged. Alternatively, a sentence embedding can be computed from pre-trained LMs, such as the BERT (Bidirectional Encoder Representations from Transformers) model or the GPT-2 model (an unsupervised Transformer LM, a generative model of language), or via an autoencoder (a type of deep NN used to learn efficient data representation in an unsupervised manner) approach. A BERT technique may be used for natural language processing pre-training.

For every two sentences, a mathematical distance (e.g. based on embeddings or embedding vectors for the sentences) may be computed between the sentences. In one embodiment, a Euclidean distance may be used if two sentences were classified to the same dialog act; if the two sentences were not classified to the same dialog act, the distance may be set to infinity (∞, e.g. MAX_LONG) to indicate in the formula the sentences not sharing the same dialog act are not to be classified into the same group or class of clusters. An example distance formula (other formulas may be used) is:

$$dist(p, q) = \begin{cases} \sqrt{\sum_{i=1}^{N}(p_i - q_i)^2}, & \text{if } DialogAct_{(p)} == DialogAct(q) \\ \infty, & \text{otherwize} \end{cases}$$

In the above example formula, if sentences p and q are assigned to the same dialog act (=being a standard operator of equality in programming) the sentences are assigned to clusters (the same or different) based on a distance, where the distance between them is the square root of the sum from 1 to N of the subtraction of the square root of the difference of i'th embedding vector entry for each sentence, the vectors having a length of N entries. If the sentences are not assigned to the same dialog act, the distance is infinity, and the sentences are not assigned to clusters relative to each other (but typically are assigned to clusters relative to other sentences).

A clustering algorithm may then be applied based on the distances to partition the sentences into clusters. Each cluster may have a centroid, a central point of the cluster computed by finding an average of all vectors in the cluster. For example, the HDBScan algorithm (A method of density-based spatial clustering of applications with noise (DBSCAN) is a density-based data clustering algorithm. Hierarchical DBSCAN (HDBSCAN) is a revised version of DBSCAN.) or a K-Means algorithm (a method of vector quantization which may partition n observations into k clusters in which each observation belongs to the cluster with the nearest mean) may be used. Other clustering algorithms can be applied as well. The clusters may be labelled or named for example based on dialog act and the actor, speaker or message sender (agent or customer). e.g. to produce the label AgentResponse1, but other naming or labelling conventions may be used. The output of a clustering process may be a set of clusters represented as for example: dict {cluster_label=>array of sentences}. Labelling need not produce meaningful labels, but may merely produce labels that are distinguishable from one another.

Each sentence may be associated or labelled with the cluster label, tag or name of the cluster the sentence is associated with.

Figure 4:
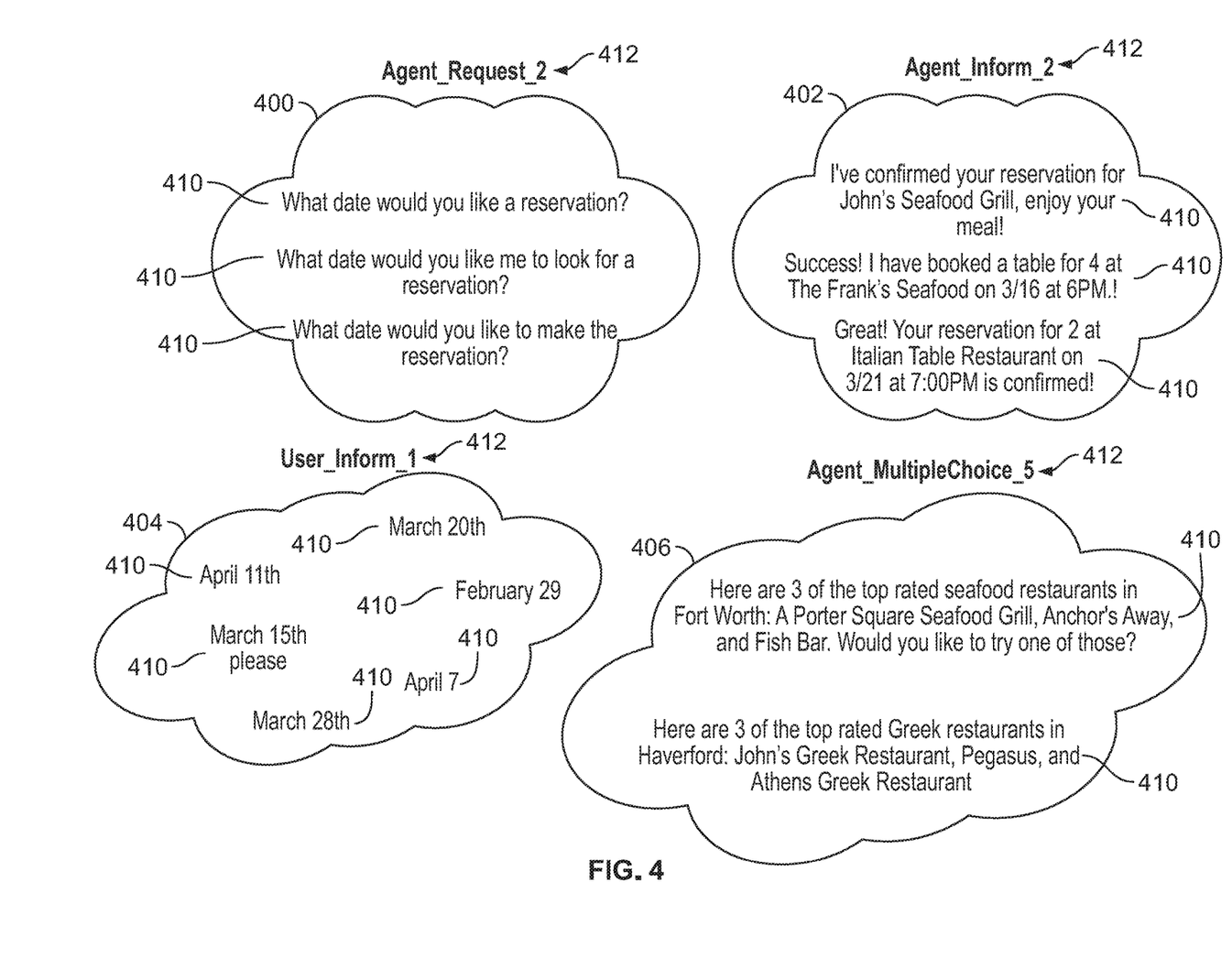
FIG. 4 is an example of a result of sentence clustering, according to an embodiment of the invention.

FIG. 4 is an example of a result of sentence clustering, according to an embodiment of the invention. Referring to FIG. 4, each of clusters 400, 402, 404 and 406 may include sentences 410, and a name or label 412.

A slot finding process (e.g. operation 340. FIG. 3) may take as input sentences from the input data set, the dialog act tag associated with each sentence, and the cluster label or tag associated with each sentence, and may identify slots and their possible values. Slots may have names (e.g. cardinal, org, date, GPE, time, etc.), and slot names in a question or other sentence preceding the response sentence may correspond to the entities found in the response. All the values for a particular slot seen in a dataset, e.g. the input data, may be the possible values for that slot. The output of a slot finding process may be a list or set of discovered slot names, and for each slot name a list of its possible values as discovered in the dataset, or for certain slots with a known but large set of values, such as "date", "time", "state within US" a descriptor (e.g. a range, a list, etc.) of all possible values for that slot. A slot may be a category description for a word or phrase. e.g. "date" may be a slot name and all the dates that occur in the dataset (e.g. the input transcript or conversation data) may be possible values, 'cardinal' may denote the numbering of a noun (e.g. the size of a set), 'org' may denote a business or institution, and 'GPE' may denote a geographic location. In some cases, multiple "date" slots, such as departure_date and return_date may be used; other slot names may be used and other slots may similarly have different types of a generalized slot. Slot finding may identify in the sentences slots, based at least in part on the dialog act classifications or groupings. For some slots that are identified, a set of possible slot values may be collected or identified; for other identified slots, no values may be identified.

A slot finding process may extract pairs of consecutive sentences from the dataset where the first sentence is a request and the second one is a response. e.g. based on the dialog act tag or classification for each sentence. For example, some dialog act tags may be classified as a request and others may be classified as a response. Certain sequential pairs of, or certain sequences of, dialog act classifications, may be identified or pre-defined; then each sequential (in the input dataset, for example sequential with no interrupting sentence) sentence pair in the data set where each sentence corresponds to dialog act classification in an identified ordered pair or dialog act classifications may be analyzed or have slots extracted. For each identified pair of sentences, logic may extract or identify slots and values. For example, named entity recognition (NER, also known as entity identification, entity chunking and entity extraction) may be applied to the response sentence to extract slot values and apply the slot finding part to the request sentence to extract slot name. The number of values for each slot name may be counted, and rare slots (with low numbers of values) may be removed.

NER may be considered a subtask of information extraction that seeks to locate and classify named entity mentions in unstructured text. A NER task may include identifying words and phrases such as those that represent different categories or slots such as those that represent people, organizations, places, expressions of time, terms and others. For example, in the sentence "Please book a table for 4 in Seattle for tomorrow at 8:00 PM at Bar Botto under the name Matt Smith": Seattle is the entity corresponding to the slot "location"; Tomorrow at 8:00 PM is the entity corresponding to the slot "date-time expression"; Bar Botto is the entity corresponding to the slot "place"; and Matt Smith is the entity corresponding to the slot "person". An NER process may be an NLP task addressed by machine learning models. In one embodiment, NER functionality from the SpaCy (https://spacy.io) open-source tool may be used. A slot finding process may take as input a sentence or string and may output slots or entities in the form of an array of, for example {name: string, type: string, span: int}. A typical output of a named entity recognition tool may include "name", the word itself; type, an entity type; and span, its offset from the beginning of the sentence.

A slot finding process may identify the slot name. Typically, slots are not pre-defined, but rather are created or identified during an embodiment of a process to create data to create a conversational bot or conversational assistant. For each identified NER entity for a sentence, the previous sentence in the sequence or interaction is accessed.

Dependency parsing (e.g. using the SpaCy toolset or another dependency parsing process) may be applied to the previous sentence. Dependency parsing may extract a dependency parse of a sentence that represents its grammatical structure and defines the relationships between "head" words and words, which modify those head words. Predefined rules may be applied to extract a slot name. A head noun may be identified, used as a slot name.

In an aggregation phase, a slot finding process may assume that slots that occur in the sentences that were clustered to the same cluster are basically the same, and can be counted together or merged to be the same slot. For example, the following example slot candidates: [people, 2], [guests, 3], [table for, 2] all as a practical matter belong to the same slot. To detect this a process may aggregate the candidate slot names in each cluster, and thus so for the examples given if taken from the same cluster, a single slot "people" may be created.

Slots that occur less than a predefined threshold may be removed. Dependency parsing is a technique in NLP that analyzes the role of each word or phrase in a sentence and the relations between them. For example, in the sentence "What is the price range of The Rock Wood Fired Pizza", the phrase "the price range" may be determined to be the head noun of the sentence (e.g. it is the subject of the sentence) and therefore, may be selected as a slot name and applied as a slot when analyzing a subsequent sentence or message.

A chat LM process (e.g. operation 350. FIG. 3) may take as input sentences from the input data set, with for each sentence the dialog act tag and cluster label, to capture the conversation flows (e.g. exchanges of messages) that occur in the dataset, and create a probabilistic structure such as a LM. The chat LM process may transform each sentence into a label and slots.

In a preprocessing step before creating or training a LM, each conversation or interaction may be converted or translated to a relevant sequence of cluster labels. Each conversation or interaction in the dataset may be represented as a sequence of clusters, cluster names or cluster labels possibly each created from a cluster name (e.g. an arbitrary integer) and dialog act. e.g.:

agent_greeting,
agent_request_1,
customer_inform_2,
agent_request_3,
customer_inform_5,
agent_confirm_answer_6,
agent_closing These conversation flows may be used to train a "conversation" LM (e.g. a recurrent neural network language model (RNNLM) or N-gram model). A LM may be generated or trained based on the cluster labels or tags or based on the sequences of cluster labels or tags. For example each actual instance of a conversation can be converted to a sequence of cluster labels. For each conversation in the dataset, a process may for each sentence, replace the sentence with the label of the cluster it was clustered to. Each sentence or message in the conversation may be assigned to a cluster (e.g. based on the cluster assignments such as performed in operation 330 above). It may be the case that clustering was performed only on a portion of data and for some conversations some sentences were not part of the clustering. In such a case, to find the cluster label, the distance of each un-clustered sentence to the centroids of the clusters may be calculated, and the nearest centroid indicates which cluster label to assign to the sentence. The RNNLM may be trained on the sequences of cluster labels, rather than actual words or actual sentences.

In one embodiment, during the LM creation process, each cluster label or tag may be represented or encoded as a number or other index, as typically an LM is trained using entities represented as numbers. For example, a vocabulary may be created where each cluster label tag is assigned or converted to a unique running or incrementing index such as increasing integers, e.g. the label or tag customer_request_1 may be converted to number 1, the label or tag agent_response_2 may be converted to 2, etc. Each number or index may be further transformed or converted, for example using a one-hot encoding (e.g. a group of bits among which the legal combinations of values are only those with a single high (1) bit and all the others low (0)). For example, in an example where there are 10 clusters having numbers indices from 1 to 10, a bit corresponding to a cluster's number may be set to 1 leaving all other bit as 0: cluster 1 becomes 0000000001, cluster 2 becomes 0000000010, cluster 3 becomes 0000000100, etc. Other encoding may be used. An auto-encoder, or a word embedding process such as the Word2vec algorithm may be used to find an encoding (e.g. vector (e.g. ordered series of numbers) of numbers) representing each cluster or cluster tag. Other methods of creating numbers for use in training an LM may be used.

For each conversation, the sentences or exchanges forming the conversation may be converted to numbers as described and a model, such as a RNNLM or a bidirectional LSTM (long short-term memory NN), may be trained on these sequences of numbers. Such a NN may generate the most probable next answer or message to be provided by a bot, when given or receiving an ordered series of conversational entities (e.g. each conversational entity represented as a dialog act combined with a cluster label, cluster names or cluster labels, or derivations of cluster names or cluster labels). The most probable next answer may be altered by a bot when output to a user by including values assigned to slots in that answer.

While a prior art LM may predict the next word given a sequence of words, a LM according to the present invention may predict the next cluster, or cluster label, based on a series of input sentences, clusters, or cluster labels. The LM may predict the next cluster, and an algorithm. e.g. in a bot, may then select the next sentence (e.g. randomly) from the selected cluster and alter it according to specific values (e.g. based on slots).

In one embodiment, a bot training process may supply the bot with the NN directly; alternately the knowledge in the NN or cluster sequences may be transformed into another format, representing all possible conversations, before being used to create a bot. For example, a generative model may be created using data produced such as conversation flows or sequences of cluster labels, or such a generative model may be produced by providing input to a NN produced or trained as described herein. A LM may be a generative model that predicts the next word given a history (e.g. a history of sentences or exchanges in a conversation). In embodiments of the present invention, a LM may be used that predicts the next or next appropriate cluster or cluster label, or produces the next appropriate message, instead of predicting words. A LM may capture or embody a probability distribution over sequences of words. Various LMs to predict a cluster may be used with embodiments of the present invention, such as classic N-gram models, RNNLMs, a jump to search model, and a BERT system.

A conversational bot, conversational assistant or chatbot may be created or trained based on the LM (e.g. operation 360, FIG. 3), the creation process taking as input sentences from the dataset, associated cluster tags for each sentence, a list of slot names and slot values, and a LM. Training a bot may be performed by the same system, processor or computer that creates the bot training data, or by a different system, computer or processor.

Standard conversational bot or conversational assistant platforms or structures may be used with embodiments of the present invention, such as the Google Dialogflow system, and may be provided with input created by embodiments of the present invention. Having data such as created by embodiments of the present invention, which may be the result of the analysis of many (e.g. thousands or hundreds of thousands) of interactions or conversations, may improve prior processes, which may rely on human input to bots. A file may be created from processes described herein (e.g. slots and associated values, a LM, etc.), and in other cases, the results can be manually added to a chatbot platform.

The structure, functioning and creation or training of the conversational bot or conversational assistant may depend on the type or vendor of the underlying bot or chatbot system, e.g. the Google Dialog Flow chatbot system, the Amazon Lex chatbot system, the Microsoft Cortana chatbot system, or other system. Such systems may include frameworks designed to facilitate creating specific chatbots serving specific business needs. For example, a telecommunications company may create or train a chatbot to handle system upgrade requests, while a financial institution might create or train a chatbot that can handle loan requests. Most platforms provide a user interface to the person training the chatbot to simplify the process of setting up a bot. In a few cases, these platforms allow for importing bots rather than developing them inside the system. In these cases the platform defines specific format for files to be imported. In one embodiment, the relevant chat language model may be used to generate the N most probable chat flows, which can be input to a bot creation system.

In one embodiment, to train a chatbot, a chatbot is provided with a list of dialog acts or intents (e.g. a several dialog acts or intent may be a customer request). For each dialog acts or intent, a list of sentences may be specified that a customer might use to specify the request. For example, dialog acts or intents may include "Can you book a @restaurantname" or "I am looking for a @cuisine restaurant", where the words '@restaurantname' and '@cuisine' are entities or slots, which can be thought of as variables that are required by the bot to execute a customer request. For each dialog act or intent, a list of mandatory and optional slots may be specified. For example, for each mandatory slot, a list of phrases may be specified that a bot can use to ask to fill this slot. For example, such phrases output by a bot may be: "What date and time would you like to go?" or "And how many guests will be in your party?" Some chatbot platforms require a definition of a list of slots and allowed values per slot. Many chatbot platforms have built-in NLU capabilities that allow it to map a customer input sentence into intent and map values to slots. In case there are mandatory slots that a customer did not provide a value for, the bot may ask the customer to provide these values using specified phrases.

A process that generates a conversational bot or conversational assistant may receive a table of slots, with for some slot values the possible values obtained from the input sentences. Other slot values may be filled in or obtained by the bot via external methods, e.g. a bot may obtain weather information.

In some embodiments, a bot may input or receive some slots which may have values to be filled not from a list extracted from input data, but rather from known ranges or types of data (e.g. time. US states, weather, etc.) where the slot values may be extracted using knowledge external to the input dataset.

Reference is made to FIG. 5, showing a high-level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various servers, computers, modules, units, NNs, LMs, bots, etc., such as those of FIG. 1. More than one computing device 100 may be included in, and one or more computing devices 100 may be, or act as the components of, a system according to some embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may create bot training data, create a bot, or act as a bot, as discussed herein. Although, for the sake of clarity, a single item of executable code 125 is shown in FIG. 5, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a CD-Recordable (CD-R) drive, a Blu-ray disk (BD), a universal serial bus (USB) device or other suitable removable and/or fixed storage unit. Data such as audio files, transcripts, bot creation data, etc. may be stored in storage system 130 and may be loaded from storage system 130 into memory 120 where it may be processed by controller 105. In some embodiments, some of the components shown in FIG. 5 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a microphone, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for creating input di to be used to train a conversational bot, the method comprising:
   receiving a set of conversations, each conversation comprising sentences;
   classifying each sentence into a dialog act of a plurality of dialog acts, resulting in multiple sets of sentences, each set corresponding to a different dialog act;
   for each set of sentences classified into a dialog act, clustering the set of sentences into clusters based on the content of the sentences, each cluster having a cluster label;
   generating a language model based on the cluster labels, the language model taking as input a series of cluster labels and predicting a next cluster label; and
   training a conversational bot using the language model.

2. The method of claim 1, comprising identifying, in the sentences, slots based in part on the dialog act classifications, the slots used as input to a conversational bot creation process.

3. The method of claim 2 comprising identifying for a slot a set of possible slot values.

4. The method of claim 1 wherein the language model comprises a neural network.

5. The method of claim 2, comprising training a conversational bot using the language model, clusters and slots.

6. A system for creating input data to be used to train a conversational bot, the system, comprising:
   a memory; and
   one or more processors configured to:
      receive a set of conversations, each conversation comprising sentences;
      classify each sentence into a dialog act of a plurality of dialog acts, resulting in multiple sets of sentences, each set corresponding to a different dialog act;

for each set of sentences classified into a dialog act, cluster the set of sentences into clusters based on the content of the sentences, each cluster having a cluster label;

generate a language model based on the cluster labels, the language model taking as input a series of cluster labels and predicting a next cluster label; and train a conversational bot using the language model.

7. The system of claim 6, wherein the one or more processors are configured to identify, in the sentences, slots based in part on the dialog act classifications, the slots used as input to a conversational bot creation process.

8. The system of claim 7, wherein the one or more processors are configured to identify for a slot a set of possible slot values.

9. The system of claim 6, wherein the language model comprises a neural network.

10. The system of claim 7, wherein the one or more processors are configured to train a conversational bot using the language model, clusters and slots.

11. A method for generating data to be used to generate an automatic conversational bot, the method comprising:

for a set of transcripts comprising sentences, grouping the sentences into dialog acts resulting in multiple sets of sentences, each set of sentences corresponding to a different dialog act;

for each set of sentences grouped into a dialog act, grouping the set of sentences into clusters, each cluster having a cluster label;

training a language model based on the cluster labels, the language model taking as input a series of cluster labels and predicting a next cluster label; and training a conversational bot using the language model.

12. The method of claim 11, comprising identifying, in the sentences, slots based in part on the dialog act groupings, the slots used as input to a conversational bot creation process.

13. The method of claim 12 comprising identifying for a slot a set of possible slot values.

14. The method of claim 11 wherein the language model comprises a neural network.

15. The method of claim 12, comprising training a conversational bot using the language model, clusters and slots.

\* \* \* \* \*